Jan. 30, 1962  J. M. CRAWFORD  3,019,412
FLOATING SUPPORT FOR SEISMIC TRANSDUCERS
Filed May 29, 1959                                           2 Sheets-Sheet 1

INVENTOR.
JOHN M. CRAWFORD
BY
Floyd Trimble
ATTORNEY

INVENTOR.
JOHN M. CRAWFORD
BY
Floyd Trimble
ATTORNEY

United States Patent Office 3,019,412
Patented Jan. 30, 1962

3,019,412
FLOATING SUPPORT FOR SEISMIC
TRANSDUCERS
John M. Crawford, Ponca City, Okla., assignor to Continental Oil Company, Ponca City, Okla., a corporation of Delaware
Filed May 29, 1959, Ser. No. 816,932
4 Claims. (Cl. 340—7)

This invention relates generally to improvements in the art of marine seismic exploration, that is, seismic exploration in water covered areas, and more particularly, but not by way of limitation to an improved apparatus for supporting a plurality of seismic transducers in a predetermined arrangement in a body of water.

As it is well known in the field of marine seismic exploration, the seismic detectors or seismometers are desirably supported within a body of water to receive seismic signals which have been transmitted through the earth under the water and returned upwardly through the water. Several different types of mechanisms have been devised for supporting the detectors under the surface of the water to receive the seismic signals. Generally speaking, these mechanisms merely comprised floats which will remain on the top of the water and cables and weights suspended from the floats to support the detectors. Heretofore, however, no adequate support has been devised which will support a large number of detectors in such a manner as to cover an area having any substantial length and width. In prior supporting systems, the detectors have generally been supported in a single line to facilitate the movement of the detectors from one area to another, and, as is well known in the art, a single line of detectors will not effectively cancel unwanted seismic signals moving in a horizontal or near-horizontal direction and yet be fully sensitive to seismic reflection or refraction energy arriving along vertical or near-vertical paths.

Similarly, it is useful to give improved vertical directivity to the seismic source by extension of its area. Thus, a pattern of seismic transducers synchronously energized may be used to generate a seismic wave which has a substantially plane wave front.

The present invention contemplates a novel assembly for supporting any desired number of seismic transducers in a body of water, with the transducers providing uniform areal coverage of the area being investigated. More specifically, the present invention contemplates a supporting assembly comprising a plurality of hollow hub members interconnected by semi-rigid inflatable members. The transducers are suspended from the hub members and the entire assembly is supported at the desired level in a body of water by floats connected to selected hub members by elastic connectors. The inflatable members are easily folded or rolled up when deflated for easy and convenient storage of the assembly on board a vessel; however, the inflatable members are semi-rigid when inflated, such that the assembly will retain the desired arrangement of the hub members when suspended in a body of water to position the transducers at the desired spacing. In a preferred embodiment, the inflatable members are in the form of lengths of flexible tubing connected to the hollow hub members in such a manner that all of the lengths of tubing are in communication to facilitate inflation and deflation of the lengths of tubing as a group from any of the hub members, whereby the time required to assemble the supporting system is reduced to a minimum.

A general object of this invention is to improve the efficiency and results obtained in marine seismic exploration projects.

Another object of this invention is to provide a support for a large number of seismic transducers properly spaced to generate a substantially plane wave.

Another object of this invention is to provide a support for a large number of seismic detectors, whereby the detectors may be uniformly supported throughout an area to be investigated, such that unwanted seismic signals moving in horizontal or near-horizontal directions may be effectively cancelled.

Another object of this invention is to provide a floating support for seismic transducers which will require a minimum storage space aboard a vessel.

A further object of this invention is to provide a floating support for seismic transducers having the maximum versatility in the patterns or arrangements in which the transducers may be supported in a body of water.

A still further object of this invention is to provide a floating support for seismic transducers used in a body of water which may be expanded to any desired size for supporting any desired number of transducers; which will have the minimum tendency to become fouled when being placed in and removed from a body of water; which is simply constructed, which will have a long service life and which may be economically manufactured.

Other objects and advantages of the invention will be evident from the following detailed description, when read in conjunction with the accompanying drawings which illustrate my invention.

Figure 1:
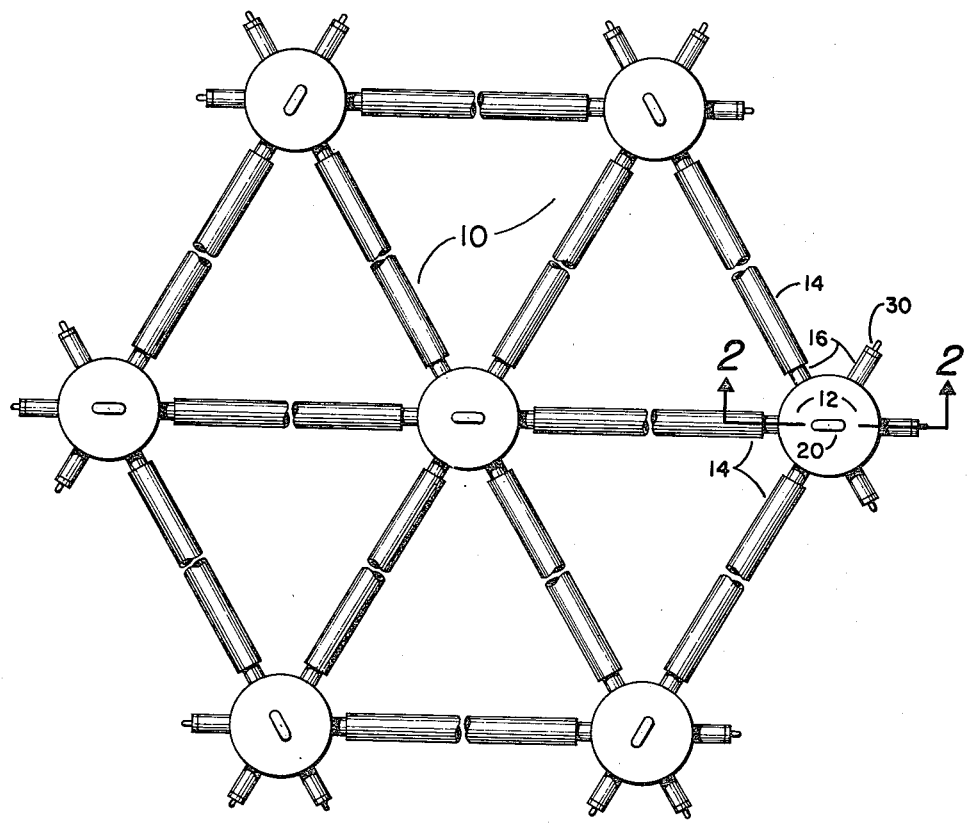
FIGURE 1 is a schematic plan view or layout of a typical floating support constructed in accordance with this invention.
Figure 2:
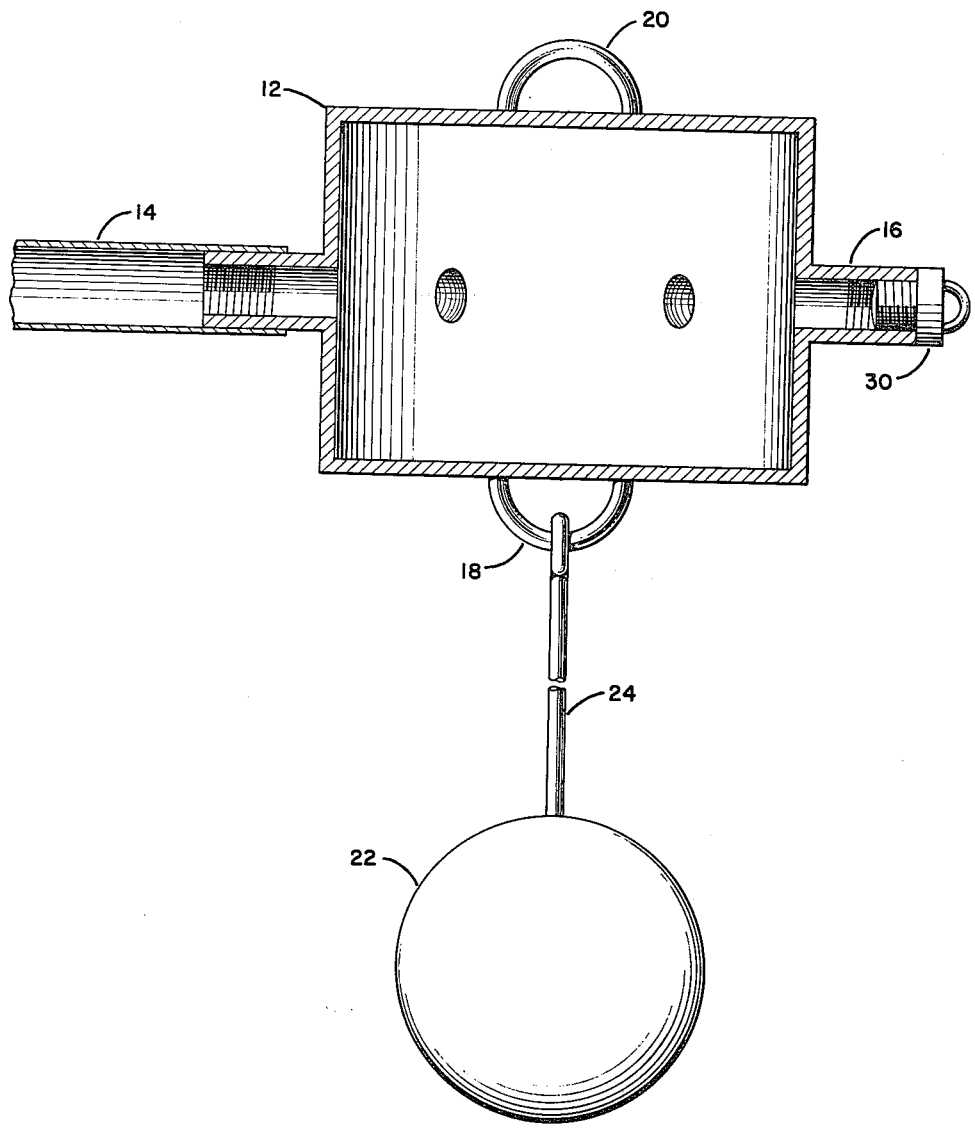
FIGURE 2 is a sectional view as taken along lines 2—2 of FIG. 1.

Referring to the drawings in detail, and particularly FIG. 1, reference character 10 generally designates a floating support constructed in accordance with this invention and which generally comprises a plurality of hollow hub members 12 interconnected by inflatable members 14. As shown in FIG. 2, each hub member 12 comprises a hollow housing having a plurality of hollow or tubular projections 16 extending outwardly therefrom in spaced relation. The hollow housing of each hub member 12 is preferably circular in plan, and the projections 16 preferably extend radially from this housing in a horizontal plane and in circumferentially spaced relation. It will also be observed in FIG. 2 that each of the hollow projections 16 communicates with the interior of the respective hub member 12, for purposes which will be hereinafter set forth. Each hub member 12 may be constructed out of any suitable material having a specific gravity slightly greater than the specific gravity of the water in which the support 10 is used, and may be constructed out of, for example, plastic or sheet metal.

Figure 3:
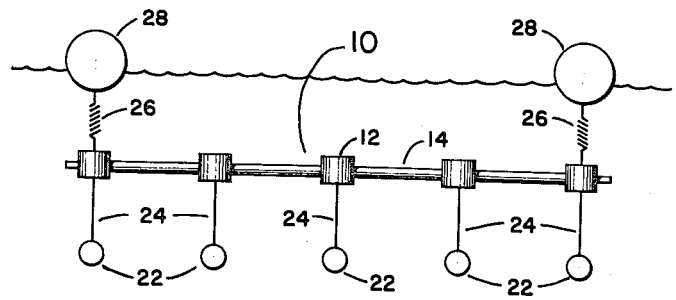
FIGURE 3 is an elevational view illustrating use of the present floating support.

Suitable connectors 18 and 20 are secured on the bottom and the top, respectively, of each hub member 12, and these connectors may take any suitable form, such as what are commonly known as eyes as illustrated in FIG. 2. Normally a transducer 22 of any suitable type is suspended from each of the hub members 12 by a cable or chain 24 secured to the lower connector 18 of the respective hub member. The upper connectors or eyes 20 of selected hub members 12 are used to connect with the lower end of springs 26 extending downwardly from suitable floats 28 as illustrated in FIG. 3, and as will be more fully hereinafter set forth.

Each inflatable member 14 is preferably in the form of a length of flexible tubing of a size to be telescoped over one of the projections 16 at each end of the respective member 14. Each end of each member 14 may be secured on the respective projection 16 in any suitable manner to provide an air-tight connection between the members 14 and the hub members 12. For example, each end of each member 14 may be cemented or glued over the respective projection 16, but is preferable that each end of each member 14 either be stretched over the respective projection 16 or secured over the respective projection 16 by clamps (not shown), such that the members 12 and 14 may be easily assembled and disassembled. Also, each member 14 may be constructed out of any flexible material which may be inflated to a semi-rigid condition and which preferably has a specific gravity slightly greater than the specific gravity of the water in which the support 10 is to be used. For example, each member 14 may be constructed out of a rubber composition, or out of a plastic composition which is flexible and may be rolled up or folded when deflated and which will be semi-rigid when inflated.

It will be apparent that since each hub member 12 is provided with several of the projections 16, the hub members may be interconnected in a variety of different ways or designs to support the desired number of detectors 22 in the desired positions. For example, seven of the hub members 12 may be interconnected in a hexagonal design as illustrated in FIG. 1, with one of the hub members 12 being positioned in the center of the assembly and the outer ring of hub members 12 being connected to the center hub and the adjacent hubs in the outer ring by the members 14. Those projections 16 not used for receiving one end of one of the members 14 are closed by suitable threaded plugs 30 as illustrated in FIG. 2. Therefore, each hub member 12 will be air-tight, and all of the members 14 will be in communication, such that all of the members 14 may be inflated or deflated as a group from any one of the hub members 12. When a limited number of the hub members 12 are used in an assembly, such as seven as shown in FIG. 1, the entire support 10 may be suspended in a body of water by a pair of floats 28 connected to hubs 12 at the opposite sides or ends of the support. As previously described, a float 28 is connected to one of the hub members 12 by means of a spring 26, such that the floats 28 may be moved independently of the members 12 and 14, and the transducers 22 will be subjected to a minimum movement by the action of waves on the surface of the water. Also, as previously indicated, and as illustrated in FIG. 3, a transducer 22 is normally suspended from each of the hub members 12 by a cable or chain 24, such that the transducers 22 will be supported in a predetermined arrangement over the area to be surveyed.

In a commercial application of the present invention, a support 10 may extend several hundred feet in length and width to support several hundred detectors 22, and several of the floats 28 and springs 26 are required to adequately suspend the support 10 without buckling of the members 14. The lengths of the members 14 may be chosen as desired to properly space the detectors 22 over the area being surveyed, such that the unwanted seismic signal traveling in horizontal or near horizontal directions will be effectively cancelled, and yet the detectors 22 will be fully sensitive to seismic reflection or refraction energy arriving along vertical or near-vertical paths.

From the foregoing it will be apparent that the present invention will materially increase the efficiency and improve the results obtained in marine seismic exploration projects. Any desired number of seismic detectors may be supported in any desired pattern or arrangement over any desired size of area, to provide the necessary cancellation of unwanted seismic signals and reception of the desired seismic signals. The present supporting assembly may be easily assembled and disassembled and may be stored in a minimum space aboard a vessel. Also the present supporting assembly may be expanded or reduced in size as desired, is simple in construction, may be economically manufactured, and will have a long service life.

Changes may be made in the combination and arrangement of parts or elements as heretofore set forth in the specification and shown in the drawings, it being understood that changes may be made in the embodiments disclosed without departing from the spirit and scope of the invention as defined in the following claims.

I claim:

1. A device for supporting a plurality of detectors in an aqueous solution comprising a plurality of hub members, a plurality of inflatable interconnecting tubular members, means for attaching said inflatable tubular members to the periphery of said hub members thereby supporting said hub members in a predetermined fixed space relationship, a float means, means for yieldably attaching said float to said hub members, and means for attaching said detectors to said hub members.

2. A device as described in claim 1 wherein each of said hub members has a communicating channel between each inflatable tubular member connected thereto and means for inflating said interconnecting tubular members whereby said communicating channels permit said plurality of interconnecting tubular members to be simultaneously inflated upon the application of compressed gas at a single location.

3. In a device for supporting a plurality of seismic detectors or the like in a body of water in a predetermined arrangement over a finite area having substantial length and width comprising: a hollow hub member for supporting each of the detectors, float means, means for attaching said float means to said hollow hub member for supporting said hollow hub member and said float means a predetermined distance below the surface of said body of water, inflatable members having a predetermined length, said inflatable members interconnecting said hub members and confining said hub members in a predetermined geometric pattern whereby said detectors are supported in a fixed space relationship to each other over a predetermined area of the water.

4. A device as defined in claim 3 wherein each hub member has a plurality of hollow projections extending radially in spaced relation therefrom, each of said projections being in communication with the interior of the respective hub member, and said inflatable members being in the form of flexible tubes inflatable to semi-rigid members, each end of each tube being telescoped over one projection of one of the hub members, and plugs in the projections of the hub members not receiving one of said tubes, whereby said tubes may be inflated simultaneously as a group.

References Cited in the file of this patent

UNITED STATES PATENTS

| | | |
|---|---|---|
| 2,570,707 | Parr | Oct. 9, 1951 |
| 2,610,240 | Pottorf | Sept. 9, 1952 |
| 2,774,955 | Toomey | Dec. 18, 1956 |